(12) United States Patent
Dawson et al.

(10) Patent No.: US 7,725,325 B2
(45) Date of Patent: May 25, 2010

(54) SYSTEM, COMPUTER PROGRAM PRODUCT AND METHOD OF CORRELATING SAFETY SOLUTIONS WITH BUSINESS CLIMATE

(75) Inventors: Christopher James Dawson, Arlington, VA (US); Simon Oliver Schneider, Munich (DE)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 11/334,229

(22) Filed: Jan. 18, 2006

(65) Prior Publication Data

US 2007/0168204 A1    Jul. 19, 2007

(51) Int. Cl.
*G06Q 10/00* (2006.01)
(52) U.S. Cl. ......................................................... 705/1
(58) Field of Classification Search ....................... 705/1
See application file for complete search history.

(56) References Cited

U.S. PATENT DOCUMENTS

| | | | |
|---|---|---|---|
| 6,856,992 | B2 | 2/2005 | Britton et al. |
| 6,938,021 | B2 | 9/2005 | Shear et al. |
| 2001/0049793 | A1 | 12/2001 | Sugimoto |
| 2004/0103058 | A1* | 5/2004 | Hamilton ...................... 705/38 |
| 2004/0111284 | A1 | 6/2004 | Uijttenbroek |
| 2004/0230835 | A1 | 11/2004 | Goldfeder et al. |
| 2005/0055330 | A1 | 3/2005 | Britton et al. |
| 2007/0100642 | A1* | 5/2007 | Paulus et al. ................... 705/1 |
| 2007/0271593 | A1* | 11/2007 | Sugimoto ....................... 726/1 |
| 2008/0104662 | A1* | 5/2008 | Young ............................ 726/1 |
| 2008/0107274 | A1* | 5/2008 | Worthy ........................ 380/278 |

OTHER PUBLICATIONS

Eckhardt, Bob; Changes in Safety Measurement; Concrete Products; Sep. 1, 2002; [online]. 5 pages. Retrieved from the Internet: < URL: http://www.concreteproducts.com/mag/concrete_changes_safety_measurement/index.html >.

MCA-Maritime and Coastguard Agency; Safer Lives, Safer Ships, Cleaner Seas; 2003-2004; [online]. 4 pages. Retrieved from the Internet: < URL: http://www.mcga.gov.uk/c4mca-safety_Information.mcga-formal_safety_assessment/mcga-fsa_mission.html >.

Occupational Hazards; Measuring Safety Performance in Construction; Jun. 17, 2002; [online]. 4 pages. Retrieved from the internet: < URL: http//www.occupationalhazards.com/safety_zones/32/article.php?id=4304.html >.

* cited by examiner

*Primary Examiner*—Jamisue A Plucinski
(74) *Attorney, Agent, or Firm*—Schmeiser, Olsen & Watts; William H. Steinberg

(57) ABSTRACT

A system, computer program product and method of correlating safety solutions implemented in a facility with the facility's business climate are provided. The system, computer program product and method are used for designing safety solutions for a facility. While doing so, a user such as a security consultant, may derive a plurality of variables from the safety solutions. The variables are used to calculate a business climate index and a safety level from which a value for a safety/climate coefficient may be calculated. The value of the coefficient indicates whether the threat level is greater than the security level, or whether the security solutions are adequate or too intrusive.

18 Claims, 4 Drawing Sheets

| | ASSESSED VALUES | CALCULATED VALUES |
|---|---|---|
| THREAT LEVEL | 3 | |
| SECURITY LEVEL | 4 | |
| SAFETY LEVEL | | 1 |
| INTRUSION LEVEL | 1 | |
| BUSINESS CLIMATE INDEX | | 3.5 |
| SAFETY / CLIMATE COEFFICIENT | | .2857 |

SYSTEM, COMPUTER PROGRAM PRODUCT AND METHOD OF CORRELATING SAFETY SOLUTIONS WITH BUSINESS CLIMATE

BACKGROUND OF THE INVENTION

1. Technical Field

The present invention is directed generally to impacts of security measures on business climates. More specifically, the present invention is directed to a system, apparatus and method of correlating safety solutions with business climate.

2. Description of Related Art

Security consultants often focus on security/safety ramifications when implementing technology-centric solutions for a client. For example, if there has been one or more shootings in a bank or robberies of the bank, a security consultant may advise bank personnel to install metal detectors at all entry points to the bank to ensure that no one is able to enter the bank armed. This security measure may lead to a decrease or an outright elimination of shootings in the bank and/or robberies of the bank. However, depending on the number of customers who conduct business at the bank, this safety measure may impinge on the business climate of the bank.

For instance, if each time a customer goes to the bank, the customer spends between a half hour to an hour in line due to the installation of the metal detectors, the customer may decide to conduct his/her banking business elsewhere. In this particular case, although the customer may perceive the bank as being safer now than before, the customer may nonetheless decide that the extra time spent in line is not worth the extra sense of security. This is an adverse impact on the business climate of the bank. Obviously, the more customers that decide to conduct their banking businesses elsewhere due to the time spent in line, the more of an impact that safety measure may have on the business climate of the bank.

Thus, when designing a security solution for a client, a security consultant should take into account two arguably competing interests: (1) increase safety level as perceived by customers of the client and (2) minimize the impact of the increased safety mechanisms on the customers.

One method that may be used to ensure that before a safety measure is implemented the impact it will have on the business climate of the client will have been taken into consideration is to correlate the two competing interests to each other. Presently, no such system or method to calculate such a correlation exists.

What is needed, therefore, is a system, apparatus and method of correlating safety measures (to be implemented by a client) with the impact of the measures on the business climate of the client.

SUMMARY OF THE INVENTION

The present invention provides a system, computer program product and method of correlating safety solutions implemented in a facility with the facility's business climate. When designing safety solutions for a facility, a user such as a security consultant may derive a plurality of variables from the safety solutions. The variables include a security level, a threat level and an intrusion level as perceived by customers, employees and/or the user. Using the security level and the threat level, a safety level may be calculated. Likewise, using the security level and the intrusion level, a business climate index may be calculated. The business climate index and the safety level are used to compute a value for a safety/climate coefficient. Using just the value of the coefficient the user may determine whether the threat level is greater than the security level, or the security solutions are adequate or too intrusive.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The safety level of a facility, as perceived by an observer, is a function of the security measures implemented at the facility if any (i.e., its security level) minus any perceived threat to the facility. This can be expressed as: $S_fL=S_cL-TL$, where $S_fL$ is the safety level, $S_cL$ is the security level and TL is the threat level.

Figure 1:
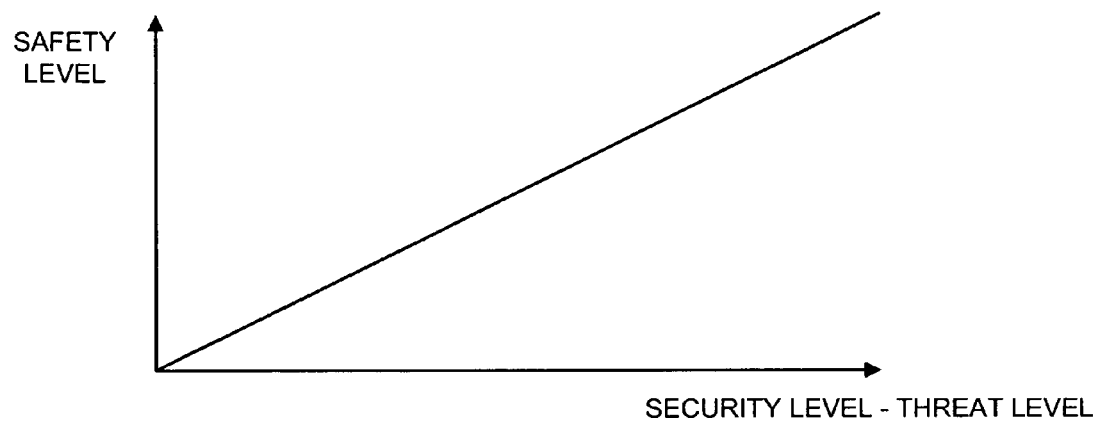
FIG. 1 depicts a safety level vs. security level minus threat level graph.

This is illustrated in FIG. 1 where it is shown that the safety level at a facility is directly proportional to the security level (of the facility)—minus the threat level (at the facility). For example, if there is a high level of security combined with a small amount of threat, the safety level is high.

The security level at a facility and the threat level of the facility can be gleaned from any, all or a combination of the following: system reports, observations, audits, surveys, expert opinions and anything else that may provide relevant data to arrive at such a conclusion. To quantify the security level of the facility after the security measures being envisioned have been implemented, a security consultant may have to determine on a scale of one (1) to five (5), for example, one (1) being the lowest and five (5) the highest, what value to ascribe to the security level of the facility based on the data gleaned above. Likewise, the security consultant may have to determine on a scale of one (1) to five (5), one being the lowest and five the highest, what value to ascribe to the threat level of the facility after the implementation of the safety measures based on the data gleaned above.

Further, the security consultant will have to calculate a business climate index. The business climate index may be defined as a function of a constant minus half the sum of the security level and the intrusion level of the security measures. In this particular case the constant is six (6). Thus, the equation to be used is: $BC=6-(S_cL+IL)/2$, where BC is the business climate, $S_cL$ is the security level and IL is the intrusion level.

The intrusion level is defined, again on a scale of 1 to 5, to represent the amount of intrusion to a customer based on the combined amount of security systems installed. For example, video surveillance has a very low intrusion level (people are not affected by a camera in the corner of a room). Metal detectors, however, may have a high intrusion level especially when there is usually a long line for a customer to go through (i.e., customers will have to spend time in line each time they have to conduct business at that client's place of business). Thus, the higher the intrusion level, the more likely it is to affect business climate.

Figure 2:
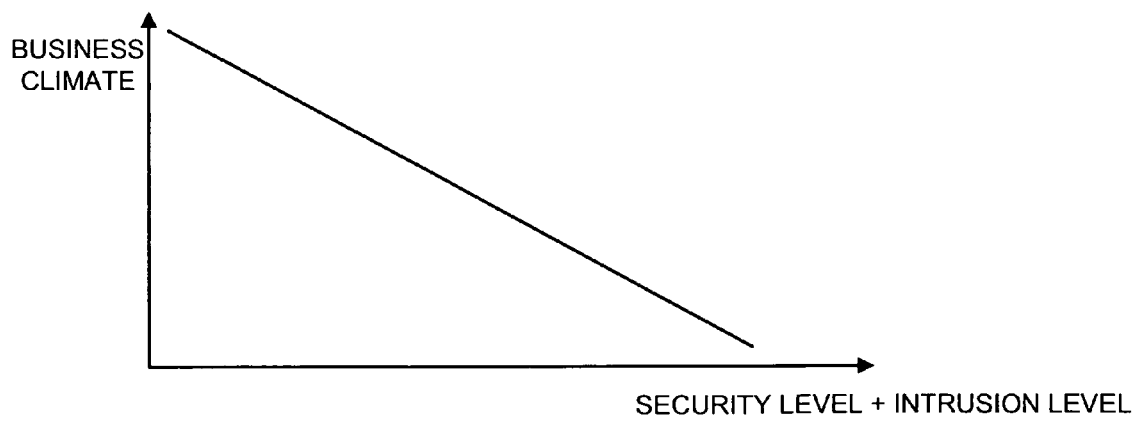
FIG. 2 depicts a business climate vs. the sum of security level and intrusion level graph.

Again, the security consultant may have to determine on a scale of one (1) to five (5), one being the lowest and five the highest, what value to assign to the intrusion level of the security measures that are to be used. As can be seen from FIG. 2, the business climate index is inversely proportional to the sum of the security level and intrusion level. Note that as long as the security and intrusion levels are calculated to fall between 1 and 5, the business climate number calculated will also fall between 1 and 5.

From the business climate index and the safety level that a facility will have after implementation of the security measures, the security consultant may derive a safety/climate coefficient. The safety/climate coefficient is the safety level divided by the business climate index: Safety/climate coefficient=$S_fL/BC=[S_cL-TL]/[S_cL+IL]$).

Figures 3, 4:
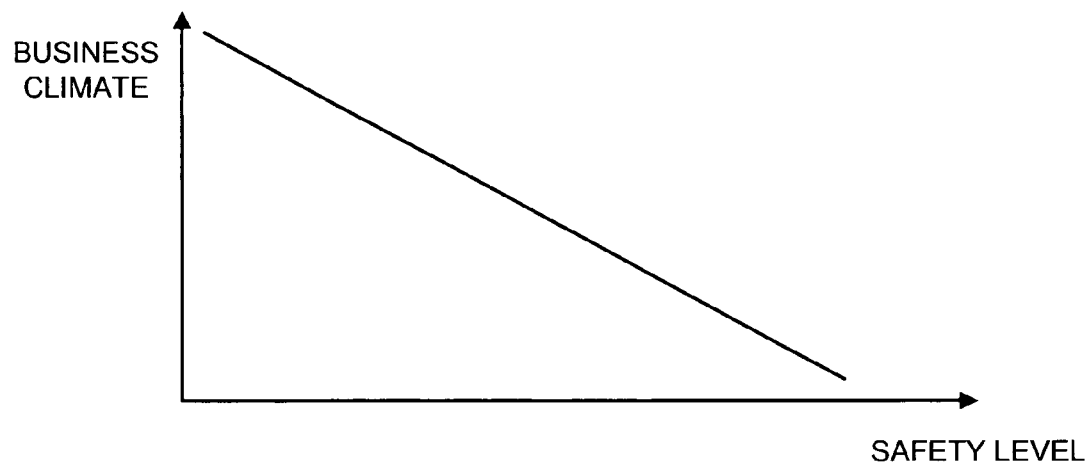
FIG. 3 depicts a business climate vs. safety level graph.
FIG. 4 illustrates an exemplary table within which values of assessed and calculated variables may be stored.

From this equation it can be seen that a negative coefficient means that the threat level is greater than the security level. Therefore, there is a low security level at the facility. If the coefficient is a positive number that is smaller than one (1), the business climate level is higher than the security level, which indicates that there is some room for additional security measures. If, however, the coefficient is a positive number higher than one (1), then the safety measures may impinge on the business climate of the facility. Hence, less intrusive security measures may have to be implemented. As is shown in FIG. 3, the business climate of a facility may be portrayed as being inversely proportional to the security measures used therein.

As an example, suppose a security consultant assigns a value of three (3) to a threat level and a value of four (4) to the security level of a facility, then the safety level of the facility is one (1): $S_fL=S_cL-TL=4-3=1$.

If the security consultant ascribes a value of one (1) to the intrusion level then the business climate index is 3.5: $BC=6-(S_cL+IL)/2=6-(4+1)/2=3.5$ Thus, the coefficient is 0.2857: $S_fL/BC=1/3.5=0.2857$ In this case then the business climate level is higher than the security level. Thus, more stringent security measures may be implemented. The values for this example may be entered into a table such as the one shown in FIG. 4.

Figure 5:
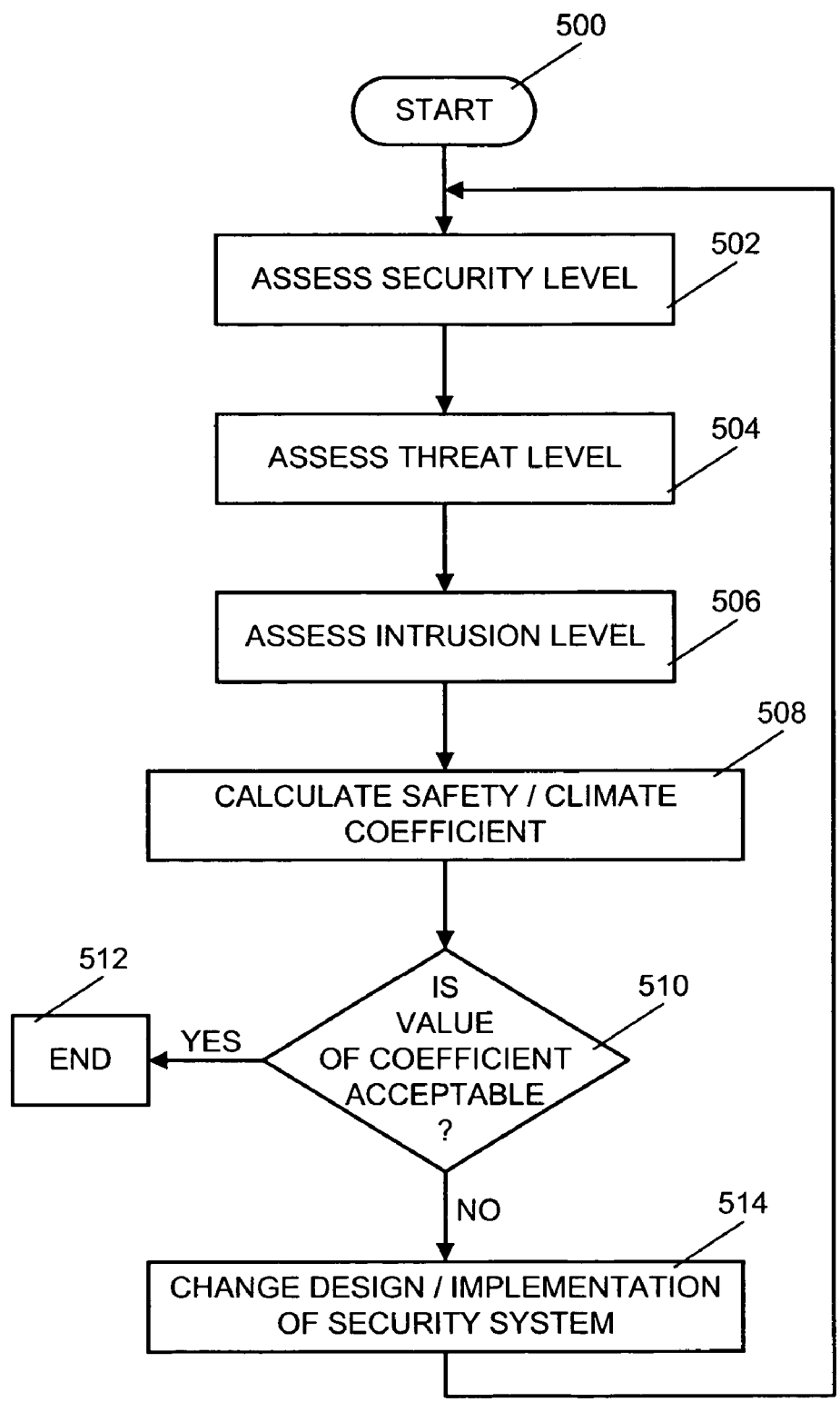
FIG. 5 is a flowchart of a process that may be used to implement the invention.

FIG. 5 is a flowchart of a process that may be used by a consultant when designing security solutions for a client. The process starts when a security consultant assesses the current or planned security level $S_cL$ of a facility (steps 500 and 502). After assessing the security level, the consultant may assess the threat level (step 504) then the intrusion level (step 506). Note that only industry accepted methods should be used to assess these variables. For example, only reliable data such as system logs, historical data, expert opinions, surveys, independent audits etc. should be used. Once the variables have been assessed, the consultant may calculate the safety/climate coefficient (step 508) by first calculating the business climate index and the safety level of the facility. Using the value of the coefficient, the consultant may determine whether the design/implementation of the security system is satisfactory (step 510). If so, the process ends (step 512). Otherwise, the consultant may change the design/implementation of the security system and the process may go back to step 502.

Figure 6:
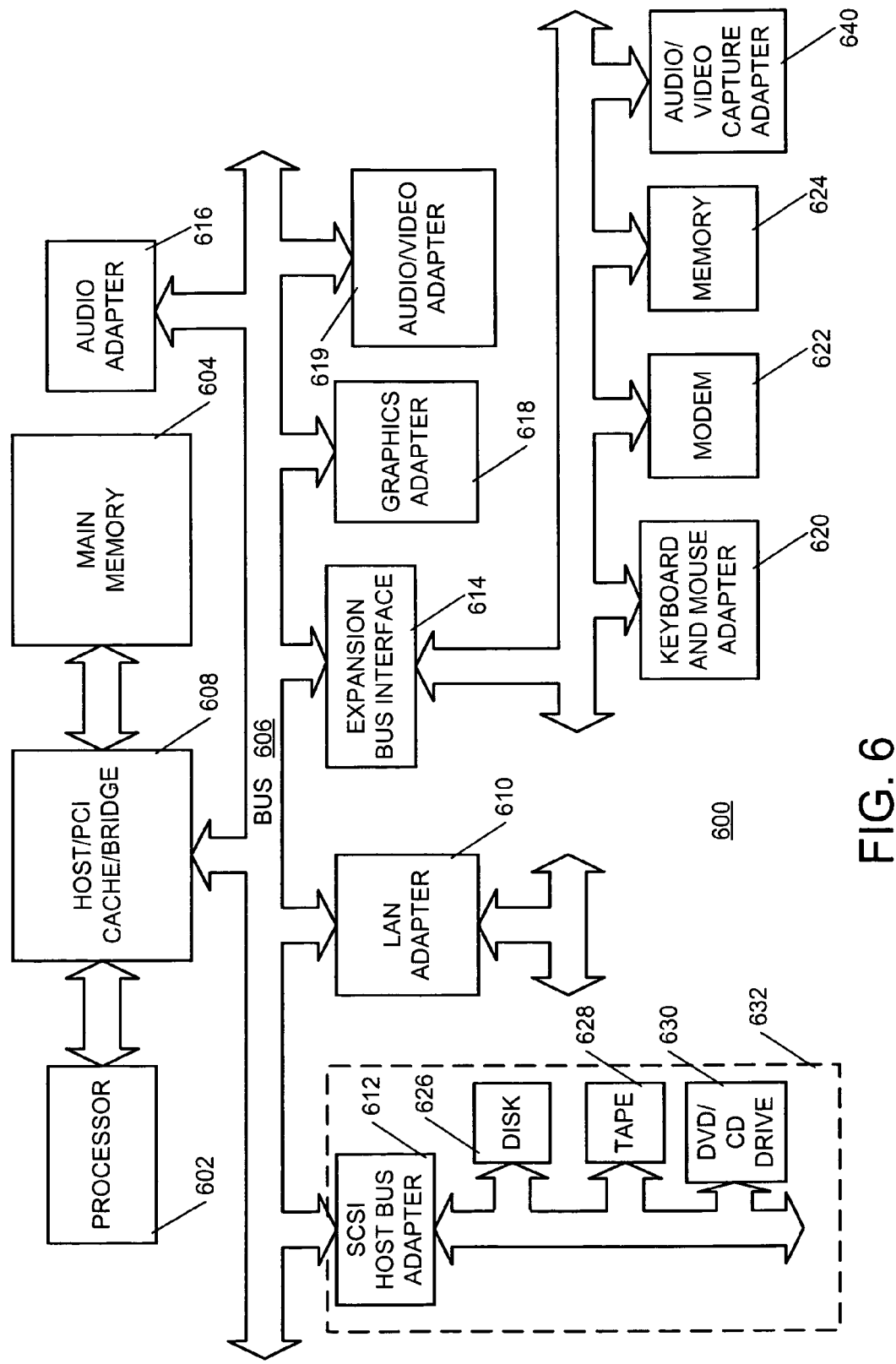
FIG. 6 is an exemplary block diagram illustrating a distributed data processing system in which the present invention may be implemented.

FIG. 6 is a block diagram illustrating a data processing system in which the invention may be implemented. Data processing system 600 employs a peripheral component interconnect (PCI) local bus architecture. Although the depicted example employs a PCI bus, other bus architectures such as Accelerated Graphics Port (AGP) and Industry Standard Architecture (ISA) may be used. Processor 602 and main memory 604 are connected to PCI local bus 606 through PCI bridge 608. PCI bridge 608 also may include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. In contrast, audio adapter 616, graphics adapter 618, and audio/video adapter 619 are connected to PCI local bus 606 by add-in boards inserted into expansion slots. Expansion bus interface 614 provides a connection for a keyboard and mouse adapter 620, modem 622, additional memory 624 and an audio/video capture adapter 640. Small computer system interface (SCSI) host bus adapter 612 provides a connection for hard disk drive 626, tape drive 628, and CD/DVD-Drive 630. Typical PCI local bus implementations will support three or four PCI expansion slots or add-in connectors.

An operating system runs on processor 602 and is used to coordinate and provide control of various components within data processing system 600 in FIG. 6. The operating system may be a commercially available operating system, such as Windows XP, which is available from Microsoft Corporation or AIX, which available from Internal Business Machines Corp. An object oriented programming system such as Java may run in conjunction with the operating system and provide calls to the operating system from Java programs or applications executing on data processing system 600. "Java" is a trademark of Sun Microsystems, Inc. Instructions for the operating system, the object-oriented operating system, and applications or programs are located on storage devices, such as hard disk drive 626, and may be loaded into main memory 604 for execution by processor 602.

Those of ordinary skill in the art will appreciate that the hardware in FIG. 6 may vary depending on the implementation. Other internal hardware or peripheral devices, such as flash ROM (or equivalent nonvolatile memory) or optical disk drives and the like, may be used in addition to or in place of the hardware depicted in FIG. 6. Also, the processes of the present invention may be applied to a multiprocessor data processing system.

The depicted example in FIG. 6 and above-described examples are not meant to imply architectural limitations. For example, data processing system 600 may also be a notebook computer or hand held computer. Data processing system 600 also may be a kiosk or a Web appliance.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of analyzing a safety level ($S_fL$) of a facility in relation to a business climate index (BC) for the facility, said method comprising:

a processor of a computer system receiving a security level input consisting of a security level ($S_cL$) that is a function of security measures implemented at the facility;

said processor receiving a threat level input consisting of a threat level (TL) representing an amount of threat to the facility;

said processor receiving an intrusion level input consisting of an intrusion level (IL) representing an amount of intrusion to a customer at the facility due to security measures at the facility;

said processor calculating the safety level ($S_fL$) from the security level ($S_cL$) and the threat level (TL);

said processor calculating the business climate index (BC) from the security level ($S_cL$) and the intrusion level (IL);

said processor calculating a safety/climate coefficient (C) according to $C=S_fL/BC$;

after said calculating C, ascertaining whether C is positive and less than 1, C is positive and greater than 1, or C is negative;

if said ascertaining ascertains that C is positive and less than 1, then increasing said security measures;

if said ascertaining ascertains that C is positive and greater than 1, then making said security measures less intrusive.

2. The method of claim 1, wherein said ascertaining ascertains that C is positive and less than 1.

3. The method of claim 1, wherein said ascertaining ascertains that C is positive and greater than 1.

4. The method of claim 1, wherein said calculating $S_fL$ comprises calculating $S_fL$ according to $S_fL=S_cL-TL$.

5. The method of claim 4, wherein said calculating BC comprises calculating BC according to $BC=K-(S_cL+IL)/2$, and wherein K is constant.

6. The method of claim 5, wherein K=6, wherein $S_cL$ is in a range of 1 to 5, wherein IL is in said range of 1 to 5, and wherein $S_cL$ is less than TL.

7. A computer program product, comprising a computer readable storage medium having a computer readable program code stored therein, said computer readable program code containing instructions configured to be executed by a processor of a computer system to implement a method of analyzing a safety level ($S_fL$) of a facility in relation to a business climate index (BC) for the facility, said method comprising:

receiving a security level input consisting of a security level ($S_cL$) that is a function of security measures implemented at the facility;

receiving a threat level input consisting of a threat level (TL) representing an amount of threat to the facility;

receiving an intrusion level input consisting of an intrusion level (IL) representing an amount of intrusion to a customer at the facility due to security measures at the facility;

calculating the safety level ($S_fL$) from the security level ($S_cL$) and the threat level (TL);

calculating the business climate index (BC) from the security level ($S_cL$) and the intrusion level (IL);

calculating a safety/climate coefficient (C) according to $C=S_fL/BC$;

after said calculating C, ascertaining whether C is positive and less than 1, C is positive and greater than 1, or C is negative;

if said ascertaining ascertains that C is positive and less than 1, then increasing said security measures;

if said ascertaining ascertains that C is positive and greater than 1, then making said security measures less intrusive.

8. The computer program product of claim 7, wherein said ascertaining ascertains that C is positive and less than 1.

9. The computer program product of claim 7, wherein said ascertaining ascertains that C is positive and greater than 1.

10. The computer program product of claim 7, wherein said calculating $S_fL$ comprises calculating $S_fL$ according to $S_fL=S_cL-TL$.

11. The computer program product of claim 10, wherein said calculating BC comprises calculating BC according to $BC=K-(S_cL+IL)/2$, and wherein K is constant.

12. The computer program product of claim 11, wherein K=6, wherein $S_cL$ is in a range of 1 to 5, wherein IL is in said range of 1 to 5, and wherein $S_cL$ is less than TL.

13. A computer system comprising a processor and a computer readable memory unit coupled to the processor, said memory unit containing instructions configured to be executed by the processor to implement a method of analyzing a safety level ($S_fL$) of a facility in relation to a business climate index (BC) for the facility, said method comprising:

receiving a security level input consisting of a security level ($S_cL$) that is a function of security measures implemented at the facility;

receiving a threat level input consisting of a threat level (TL) representing an amount of threat to the facility;

receiving an intrusion level input consisting of an intrusion level (IL) representing an amount of intrusion to a customer at the facility due to security measures at the facility;

calculating the safety level ($S_fL$) from the security level ($S_cL$) and the threat level (TL);

calculating the business climate index (BC) from the security level ($S_cL$) and the intrusion level (IL);

calculating a safety/climate coefficient (C) according to $C=S_fL/BC$;

after said calculating C, ascertaining whether C is positive and less than 1, C is positive and greater than 1, or C is negative;

if said ascertaining ascertains that C is positive and less than 1, then increasing said security measures;

if said ascertaining ascertains that C is positive and greater than 1, then making said security measures less intrusive.

14. The computer system of claim 13, wherein said ascertaining ascertains that C is positive and less than 1.

15. The computer system of claim 13, wherein said ascertaining ascertains that C is positive and greater than 1.

16. The computer system of claim 13, wherein said calculating $S_fL$ comprises calculating $S_fL$ according to $S_fL=S_cL-TL$.

17. The computer system of claim 16, wherein said calculating BC comprises calculating BC according to $BC=K-(S_cL+IL)/2$, and wherein K is constant.

18. The computer system of claim 17, wherein K=6, wherein $S_cL$ is in a range of 1 to 5, wherein IL is in said range of 1 to 5, and wherein $S_cL$ is less than TL.

* * * * *